S. HARTLAND.
BOX CAR WITH MOVABLE TOP.
APPLICATION FILED JUNE 24, 1912.
1,099,361.
Patented June 9, 1914.
5 SHEETS—SHEET 1.
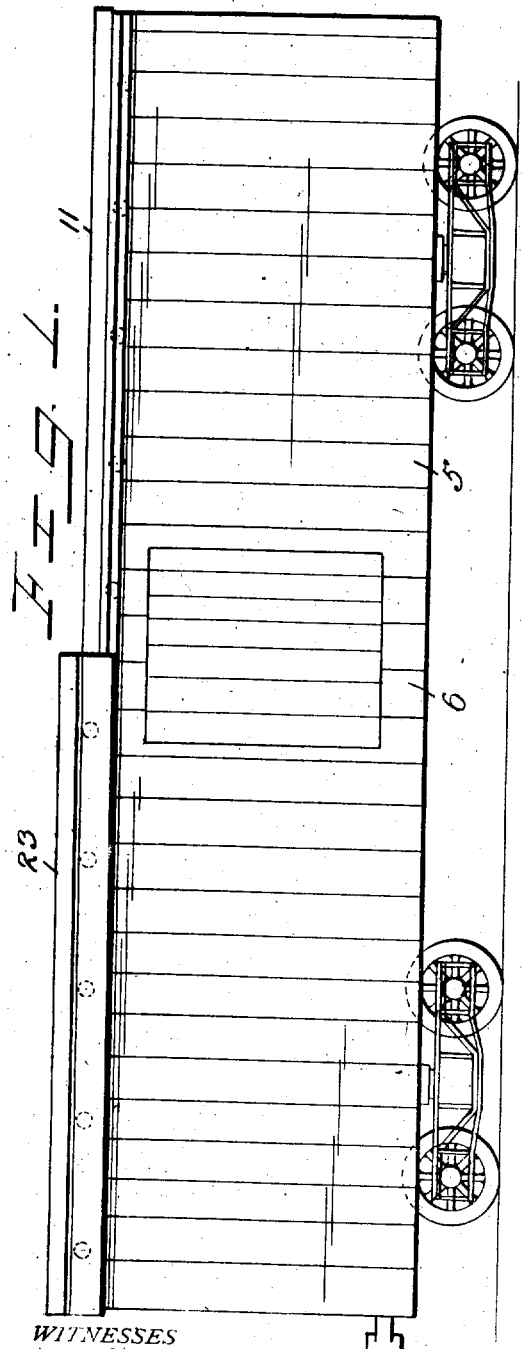
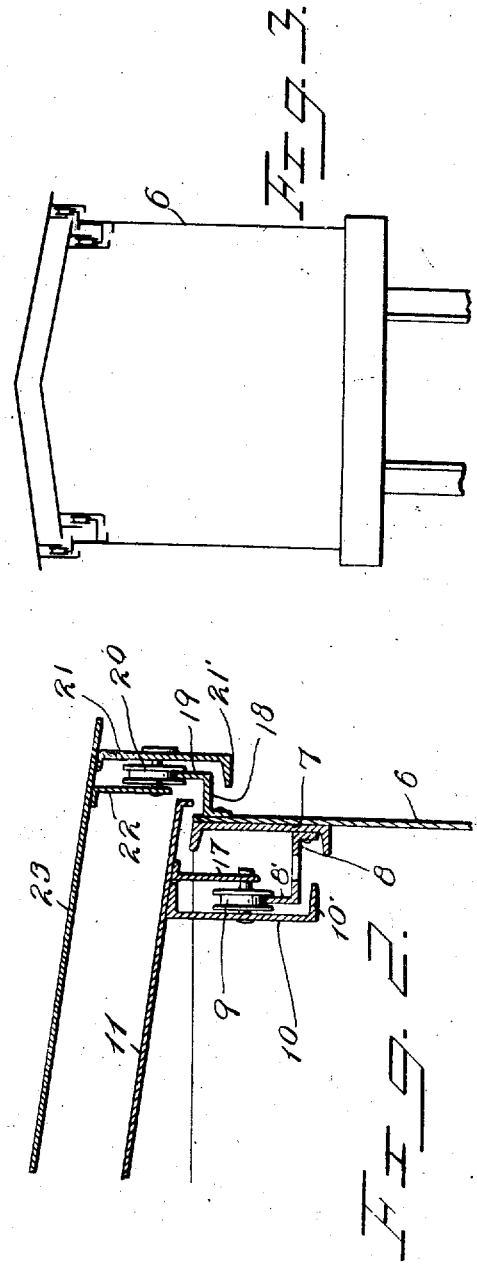
WITNESSES
INVENTOR
Sam Hartland
By
Attorney

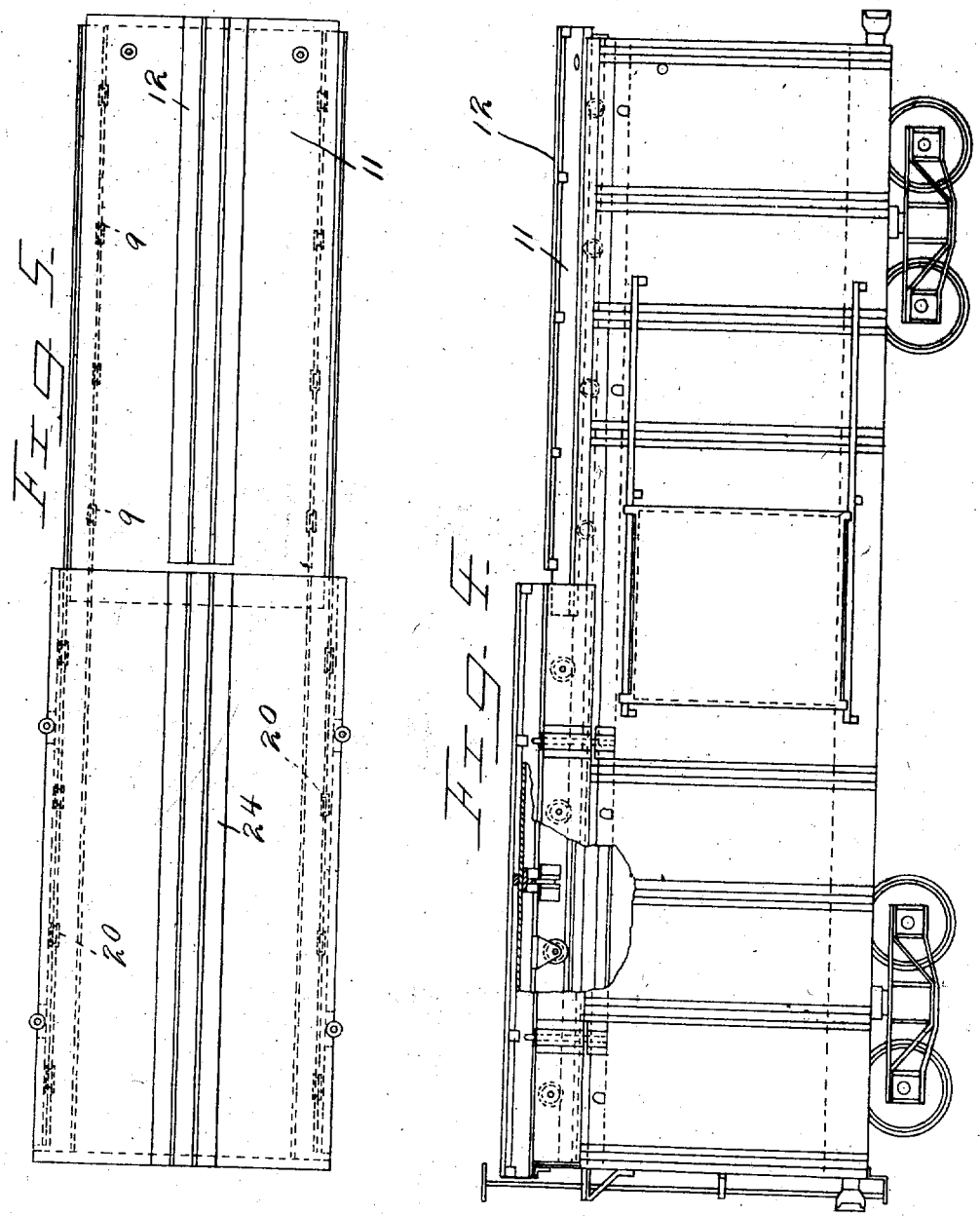

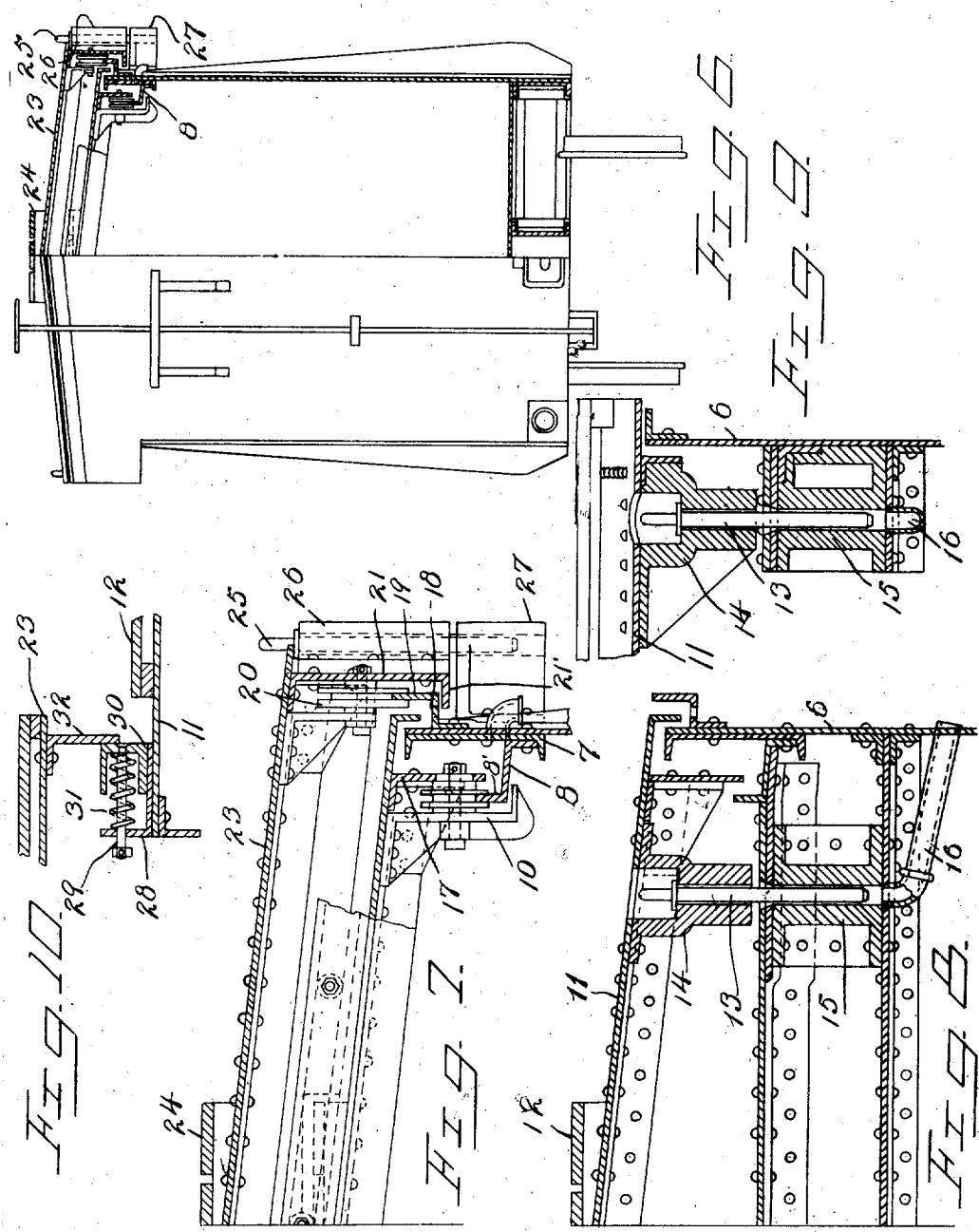

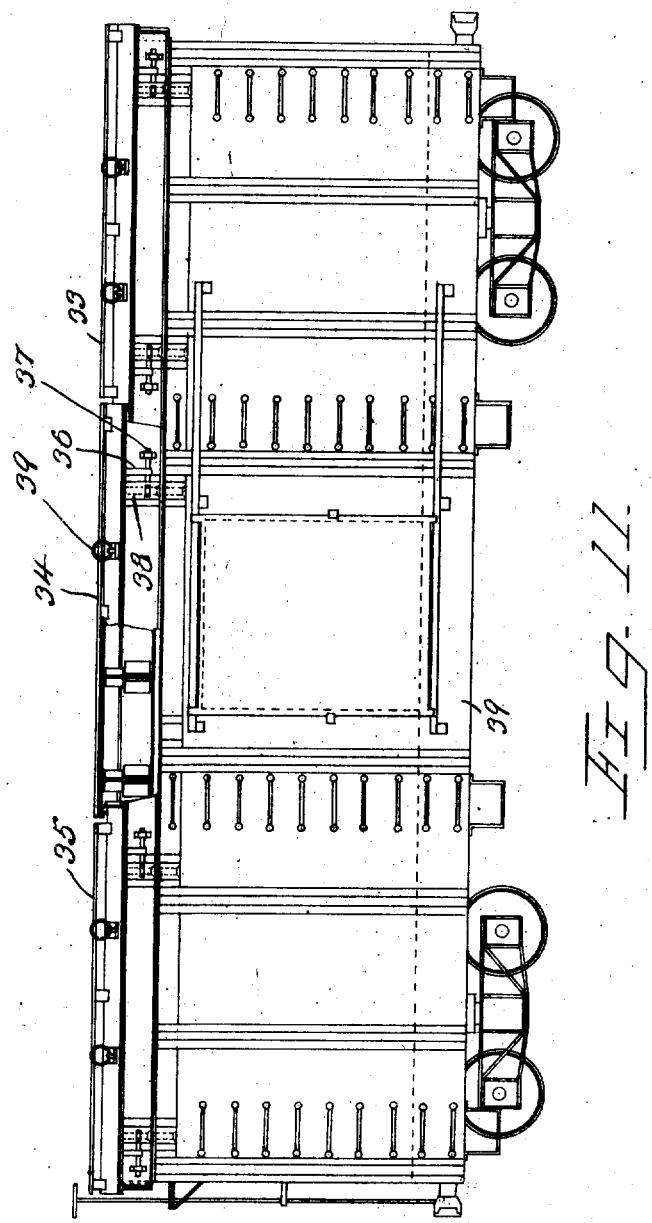

S. HARTLAND.
BOX CAR WITH MOVABLE TOP.
APPLICATION FILED JUNE 24, 1912.
1,099,361.
Patented June 9, 1914.
5 SHEETS—SHEET 5.
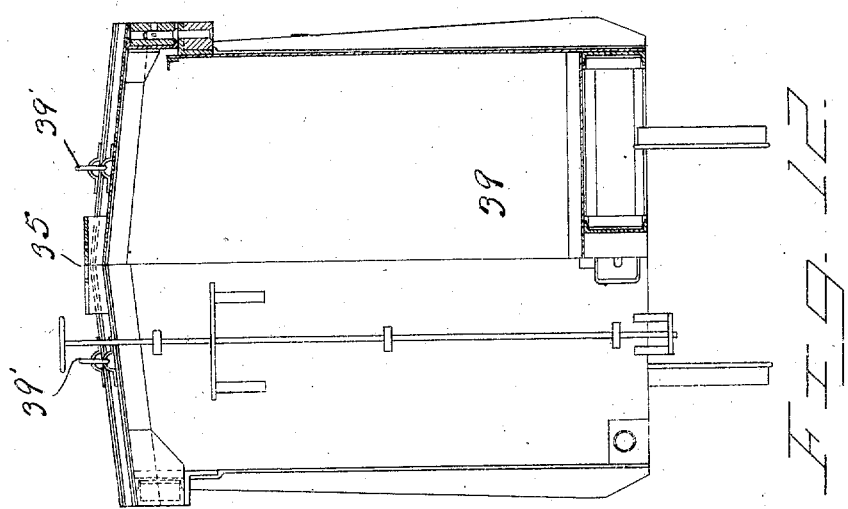
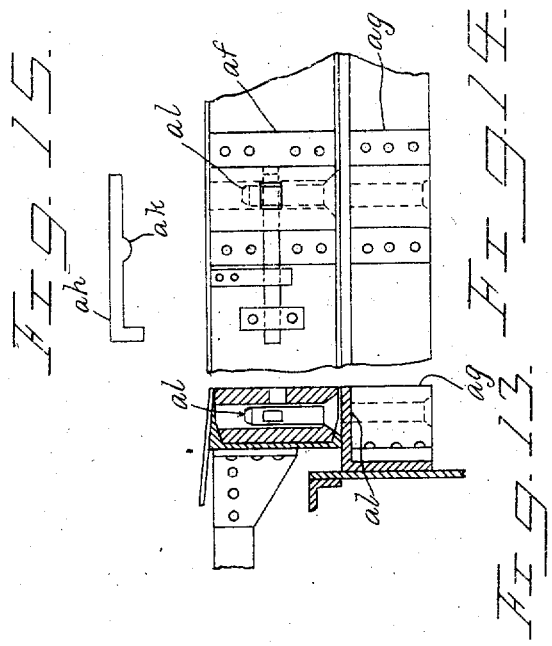
WITNESSES:
INVENTOR
Sam Hartland
BY
ATTORNEY

UNITED STATES PATENT OFFICE.

SAMUEL HARTLAND, OF YOUNGSTOWN, OHIO.

BOX-CAR WITH MOVABLE TOP.

1,099,361.  Specification of Letters Patent.  Patented June 9, 1914.

Application filed June 24, 1912. Serial No. 705,592.

*To all whom it may concern:*

Be it known that I, SAMUEL HARTLAND, a citizen of the United States, residing at Youngstown, in the county of Mahoning and State of Ohio, have invented certain new and useful Improvements in Box-Cars with Movable Tops, of which the following is a specification.

This invention relates to improvements in freight cars and its leading object is to provide a freight car with a movable top adapted to permit of the loading of the car by a crane or other power lifting and loading device, whereby the entire car may be more quickly loaded than under the present side door filling arrangement.

One of the objects of the invention is to provide a car for transporting freight with a plurality of movable tops mounted upon wheels and adapted for ready movement over the top so that the roof of the car may be opened for the loading of the same.

Another object of the invention is to provide a car of this type in which the various details are constructed to provide for efficiency of operation and simplicity of manufacture.

With the above and other objects in view the invention relates to certain constructions, combinations, and arrangements of parts, clearly described in the following specification and clearly illustrated in the accompanying drawings in which, Figure 1 is a side elevation of a car constructed in accordance with my invention. Fig. 2 is a detail sectional view showing the inner and outer roof sections and the respective tracks and wheels therefor. Fig. 3 is an end elevation. Fig. 4 is a side elevation partly broken away showing the relative positions of the section of the movable top. Fig. 5 is a plan view showing the inner and outer running boards of the inner and outer roof sections. Fig. 6 is an end elevation partly in vertical section showing the coupling means between the upper or outer roof section and the car. Fig. 7 is an enlarged detail sectional view of said coupling means. Fig. 8 is a vertical sectional view showing the coupling means for connecting the outer and inner roof sections. Fig. 9 is another sectional view of said coupling means. Fig. 10 is a detail sectional view showing a resilient weather strip for sealing the connection between the two roof sections. Fig. 11 is a side elevation of a modified form of a car having a sectional removable top. Fig. 12 is an end elevation partly in vertical section thereof. Fig. 13 is a sectional detail. Fig. 14 is an elevation looking at right angles to Fig. 13. Fig. 15 is a detail in elevation.

Referring to the accompanying drawings illustrating the practical application of the invention 5 denotes a freight car which is provided with the usual trucks and running gear the body of which may be constructed in accordance with any plan of design. The sides 6 of the car are provided with reinforcing members 7 secured to their upper inner faces and these reinforcing members carry angular tracks 8, which are provided with upstanding inner portions 8' on which the wheels 9 carried by the depending bracket 10 of the inner roof section 11 are adapted to move. The track 8 extends the full length of the car so that the inner roof section 11 can be moved from one end of the car to the opposite end thereof. The inner section 11 of the roof is provided with a running board 12 and is connected to the car by means of a coupling pin 13 which passes through a socket 14 fixed to the top section 11 and engages a socket 15 carried by the car 5. A pipe 16 has its upper end below the opening in the socket 15 and extends at an outward and downward incline through the side of the car for draining the socket 15 of water. The inner roof section 11 also carries brackets 17 for supporting the wheels 9 and the brackets 11 are provided with guard flanges 10' for preventing the upper movement of the roof section 11 on the tracks 8.

Tracks 18 are secured to the outer faces of the car sides 6 and on the upstanding flanges 19 thereof, the wheels 20 carried by the depending brackets 21 and 22 of the upper car section 23 operate. The lower ends of the brackets 21 are provided with guard flanges 21' for preventing the upper movement of the outer top section 23. The outer top section 23 is provided with a suitable running board 24 and said outer top section is adapted to move over the car from one end thereof to the opposite end and over the inner top section 11. The outer top section 23 is held against movement on the car by means of coupling pins 25 which pass through sockets 26 carried by the outer edge portions of said top section 23 and which engage sockets 27 secured to the outer faces of the car sides 6. The inner roof section 11 is provided with an end flange 28 through which a rod 29 slides, the inner end of said rod being secured to a metal weather strip 30, which is held outwardly of the flange 28 by a spring 31 coiled around the rod 29. The weather strip 30 abuts against a flange 32 depending from the upper roof section 23. By this weather sealing means the joint between the inner and outer roof section is weather sealed when the two roof sections are in closing positions.

By the improved construction shown and described it is possible for the car to be quickly loaded through the top thereof, one end of the car being loaded while one of the roof sections is moved to an open position and then the other end of the car being loaded while the other roof section is moved to its open position.

In Figs. 11 and 12 I have described a modification of the invention in which a sectional top consisting of sections 33—34 and 35 is provided. The sections 33—34 and 35 carry depending lugs 36 through which pins 37 are extended, and which engage lugs 38 carried by the car 39. The sections may be of any number and are provided with suitable hoisting rings 39 whereby each section may be lifted from the top of the car.

Having described my invention I claim:

1. A railroad car having inner and outer tracks, inner and outer roof sections movable on said tracks, independently of each other, means on the inner roof section for preventing upward movement of said section, means connecting said inner section to the car, and means for draining the same.

2. A railroad car having inner and outer tracks, inner and outer roof sections movable on said tracks, independently of each other, means on the inner roof section for preventing upward movement of said section, and means for sealing the joint between the inner and outer sections.

3. A railroad car having inner and outer tracks, inner and outer roof sections movable on said tracks, independently of each other, means on the inner roof section for preventing upward movement of said section, and means carried by the one section and coöperating with means on the other section for sealing the joint between the inner and outer sections.

4. A railroad car provided with inner and outer tracks, an inner roof section movable on said inner tracks, an outer roof section movable on said outer tracks, an abutment carried by said outer roof section located at one end thereof, an upstanding flange carried by the inner roof section, a rod slidable through said upstanding flange, a weather strip carried by said rod and engaging said abutment and a spring mounted on said rod.

5. A railroad car provided with tracks on its upper end, a roof section movable on said tracks, a socket secured to said roof section, a drain pipe extending from said socket through the side of the car, a socket secured to said roof section, and a coupling pin movable in the sockets for holding said roof section against movement.

In testimony whereof I affix my signature in presence of two witnesses.

SAMUEL HARTLAND.

Witnesses:
R. J. NICHOLSON,
J. B. KLING.